(12) United States Patent
Ko

(10) Patent No.: US 10,098,452 B2
(45) Date of Patent: Oct. 16, 2018

(54) MULTI-HOLDER FOR LEARNING

(71) Applicant: HOWMEME CO., LTD., Cheonan-si, Chungcheongnam-do (KR)

(72) Inventor: Da Hyun Ko, Cheonan-si (KR)

(73) Assignee: HOWMEME CO., LTD., Cheonan-si (KR)

( * ) Notice: Subject to any disclaimer, the term of this patent is extended or adjusted under 35 U.S.C. 154(b) by 0 days.

(21) Appl. No.: 15/815,001

(22) Filed: Nov. 16, 2017

(65) Prior Publication Data

US 2018/0070720 A1  Mar. 15, 2018

(30) Foreign Application Priority Data

May 22, 2015 (KR) .................. 20-2015-0003302 U

(51) Int. Cl.
*A47B 23/04* (2006.01)
*A47B 23/06* (2006.01)
*F16M 13/00* (2006.01)

(52) U.S. Cl.
CPC ............ *A47B 23/043* (2013.01); *A47B 23/04* (2013.01); *A47B 23/06* (2013.01); *F16M 13/00* (2013.01)

(58) Field of Classification Search
CPC ..... A47B 23/043; A47B 23/06; A47B 23/042; A47B 2023/049; A47B 27/02; A47B 23/001; A47B 23/002
USPC ....... 248/454–458, 460, 463, 448, 447, 444, 248/441.1
See application file for complete search history.

(56) References Cited

U.S. PATENT DOCUMENTS

| | | | | |
|---|---|---|---|---|
| 3,991,967 A * | 11/1976 | Sack | .................... | A47B 23/043 248/448 |
| 4,323,214 A * | 4/1982 | DeLuca | ............... | A47B 23/043 248/452 |
| 5,393,029 A * | 2/1995 | Senko | .................. | A47B 23/043 248/447 |
| 6,068,299 A * | 5/2000 | Peltzer | .................. | B42D 17/00 281/28 |

(Continued)

FOREIGN PATENT DOCUMENTS

KR   20-0175089 Y1   3/2000
KR   20-0437092 Y1   11/2007

(Continued)

OTHER PUBLICATIONS

International Search Report issued for corresponding International Patent Application No. PCT/KR2016/003783, dated Jul. 27, 2016, with an English translation.

*Primary Examiner* — Nkeisha Smith
(74) *Attorney, Agent, or Firm* — Myers Wolin, LLC

(57) ABSTRACT

The present invention relates to a multi-holder for learning, capable of holding a book or a smart pad thereon and comprising: a body; a first device for folding a support unit hinge-coupled to one side of the lower part of the body so as to be rotatable around a hinge shaft; a second device for folding a support unit hinge-coupled to the other side of the lower part of the body so as to be rotatable around a hinge shaft formed parallel with the hinge shaft; a folding floor plate device formed to be rotatable around the hinge shaft at a lower end portion of the body so as to erect and support the body; and a fixing device sliding in the longitudinal direction of the body so as to be adjustable in height, and formed at the upper portion of the body.

6 Claims, 7 Drawing Sheets

(56) References Cited

U.S. PATENT DOCUMENTS

| | | | | |
|---|---|---|---|---|
| 9,198,507 B1 * | 12/2015 | Lau | ........................ | A47B 23/00 |
| 2009/0140119 A1 * | 6/2009 | To | ........................ | A47B 23/044 |
| | | | | 248/455 |
| 2014/0183324 A1 * | 7/2014 | Pencak | ................... | A47F 7/142 |
| | | | | 248/455 |
| 2014/0252196 A1 * | 9/2014 | Abady | ................. | A47B 19/002 |
| | | | | 248/447 |
| 2015/0115125 A1 * | 4/2015 | Hou | ..................... | A47B 23/043 |
| | | | | 248/454 |

FOREIGN PATENT DOCUMENTS

| | | |
|---|---|---|
| KR | 20-2010-0005878 U | 6/2010 |
| KR | 20-2011-0008518 U | 9/2011 |
| KR | 10-1293836 B1 | 8/2013 |

\* cited by examiner

MULTI-HOLDER FOR LEARNING

CROSS-REFERENCE

This application is a continuation application of international application PCT/KR2016/003783, filed on Apr. 11, 2016, now pending, which claims foreign priority from Korean Patent Application No. 20-2015-0003302 filed on May 22, 2015 in the Korean Intellectual Property Office, the disclosure of each document is incorporated herein by reference.

TECHNICAL FIELD

The present invention relates to a multi-holder for learning, and more particularly, to a multi-holder for learning allowing a book or smart pad to be held.

BACKGROUND ART

Generally, holders for books and reading desks are installed on a desk or the like such that books may be easily read, and include a stand on which a book is laid, an angle adjusting unit configured to adjust the stand to a predetermined angle according to user's eyes, and a clamp for holding pages of the book. Various book holders are being used with this basic configuration.

DISCLOSURE

Technical Problem

However, since a conventional holder for reading placed on a desk occupies a considerable area even when not used for reading, efficiency of space utilization on the desk is lowered. Further, although a user desires to carry the holder for reading in a library, a reading room, or the like, the holder is mostly formed with wood or plastic boards and is difficult to carry.

The present invention is directed to providing a multi-holder for learning capable of securing a suitable gradient to reduce fatigue of the neck of a reader when the reader is reading a book, being folded to minimize a size of the holder and improve portability of the holder, supporting a page of the book held in an unfolded state to prevent the page from being turned, and stably supporting a smart pad. However, these objects are exemplary, and the scope of the present invention is not limited thereto.

Technical Solution

One aspect of the present invention provides a multi-holder for learning including a body, the first device for folding a support unit hinge-coupled to one side of a lower part of the body to be rotatable around a hinge shaft, and folded in a longitudinal direction of the body or rotated and unfolded in a direction toward one side of a book or smart pad, the second device for folding a support unit hinge-coupled to the other side of the lower part of the body to be rotatable around a hinge shaft formed to be parallel with the hinge shaft, and folded in the longitudinal direction of the body or rotated and unfolded in a direction toward the other side of the book or smart pad, a folding floor plate device formed to be rotatable around a hinge shaft at a lower end portion of the body, and folded in the longitudinal direction of the body or unfolded in a rearward direction to erect and support the body, and a fixing device configured to allow a height of the body to be adjustable by sliding in the longitudinal direction of the body and formed on the body to fix an upper part of the book or the smart pad having different heights.

The body may include a rail formed to allow the fixing device to slide, a first connector connected to the first device for folding a support unit and formed on a part of a left side of the body, and a second connector connected to the second device for folding a support unit and formed on a part of a right side of the body.

The fixing device may include a fixing head formed to fix the upper part of the book or smart pad, a lifting bar linked with the first connector and the second connector and configured to slide on the rail, a fixing pin formed in a pin shape on a lower part the fixing head to fix a center of the upper part of the book, and a switch linked with the fixing pin to lift the fixing pin in an upward direction.

The first device for folding a support unit and the second device for folding a support unit may include a support part hinge-coupled to a hinge shaft with a spring to support rear parts of the one side and the other side of the book or smart pad to be rotatable around the hinge shaft, and folded in a longitudinal direction of the first device for folding a support unit or rotated and unfolded in an upward direction, a holding device hinge-coupled to a hinge shaft with a spring to support lower parts of the one side and the other side of the book or smart pad to be rotatable around the hinge shaft, and folded in the longitudinal direction of the first device for folding a support unit or rotated and unfolded in a forward direction, and a coupler engaged with the first connector and the second connector.

A lower end portion of the lifting bar linked with the first connector and the second connector may be hook-coupled to the coupler when the fixing device is located at a lower location, and when the fixing device is moved in the upward direction, the first connector and the second connector may be disconnected from the coupler so that the first device for folding a support unit and the second device for folding a support unit may be unfolded toward both sides of the multi-holder.

The support part may be rotated and unfolded by the spring in the upward direction when the first device for folding a support unit and the second device for folding a support unit are unfolded from the body.

The holding device may include a press pin formed to be perpendicular to a longitudinal direction of the holding device and hinge-coupled to a hinge shaft with a spring to be rotatable around the hinge shaft, and folded into the holding device or rotated and unfolded in the upward direction, and a groove portion formed at a center of the holding device such that the press pin is easily removed.

The holding device may receive an elastic restoring force to be folded by the springs of the first device for folding a support unit and the second device for folding a support unit to bind and hold one side of the book or smart pad due to elastic forces acting in directions toward the first device for folding a support unit and the second device for folding a support unit.

The multi-holder may further include an angle adjusting device formed to be rotatable around a hinge shaft, and configured to adjust an angle of the body by being folded in the longitudinal direction of the body or being rotated in a rearward direction, wherein the angle adjusting device may include an angle adjusting device fixing unit formed with a plurality of steps on the folding floor plate device to be fixed and not pushed.

Advantageous Effects

According to some embodiments of the present invention, since a press pin formed on a device for folding a support unit is installed on a holding device, pages of a book held on a holder can be supported by the press pin, and thus the book can be conveniently read because the pages of the book are prevented from being turned. Further, since a press pin binds an end portion of an inclined book to prevent a book from being pushed toward a front of a holder, a state of the holder can be stably maintained, and since a groove portion is formed, the book or a smart pad can be more stably seated. In addition, since all parts are hinged to be easily portable and capable of being conveniently stored or used and a device for folding a support unit and a support part are unfolded by sliding a fixing head, a multi-holder for learning can be easily used. However, the scope of the present invention is not limited by the effects.

MODES OF THE INVENTION

Figure 1:
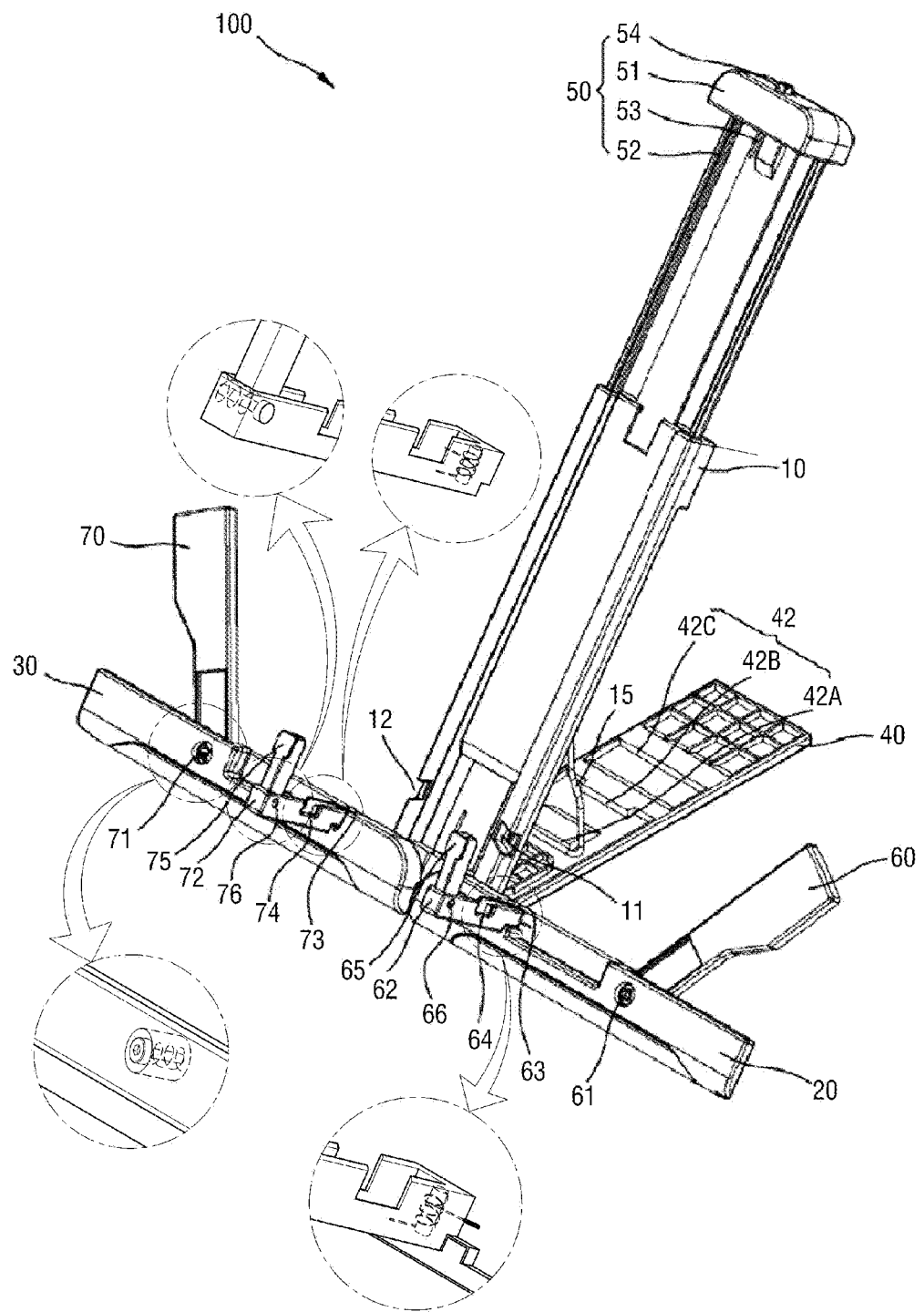
FIG. 1 is a perspective view illustrating a multi-holder for learning according to one embodiment of the present invention.

A detailed description for the present invention described below refers to the accompanying drawings showing specific embodiments in which the present invention is embodied. The embodiments are described in detail so that those skilled in the art may sufficiently embody the present invention. Although various embodiments of the present invention are different, it should be understood that the embodiments are not mutually exclusive. For example, specific shapes, structures, and characteristics disclosed herein may be implemented in other embodiments without departing from the technical spirit and scope of the present invention according to one embodiment. Further, a location or disposition of an individual component in each disclosed embodiment should be understood as being variable without departing from the technical spirit and the scope of the present invention. Accordingly, the detailed description described below is not to be construed as having a limited meaning, and the scope of the present invention is limited only by the appended claims and the scope of their equivalents when suitably described. Similar reference numerals in the drawings designate the same or similar functions throughout several aspects, and a width, a length, a thickness, a shape, and the like of elements are exaggerated for the sake of convenience.

Hereinafter, a configuration of the present invention will be described in detail with reference to the accompanying drawings.

Figure 2:
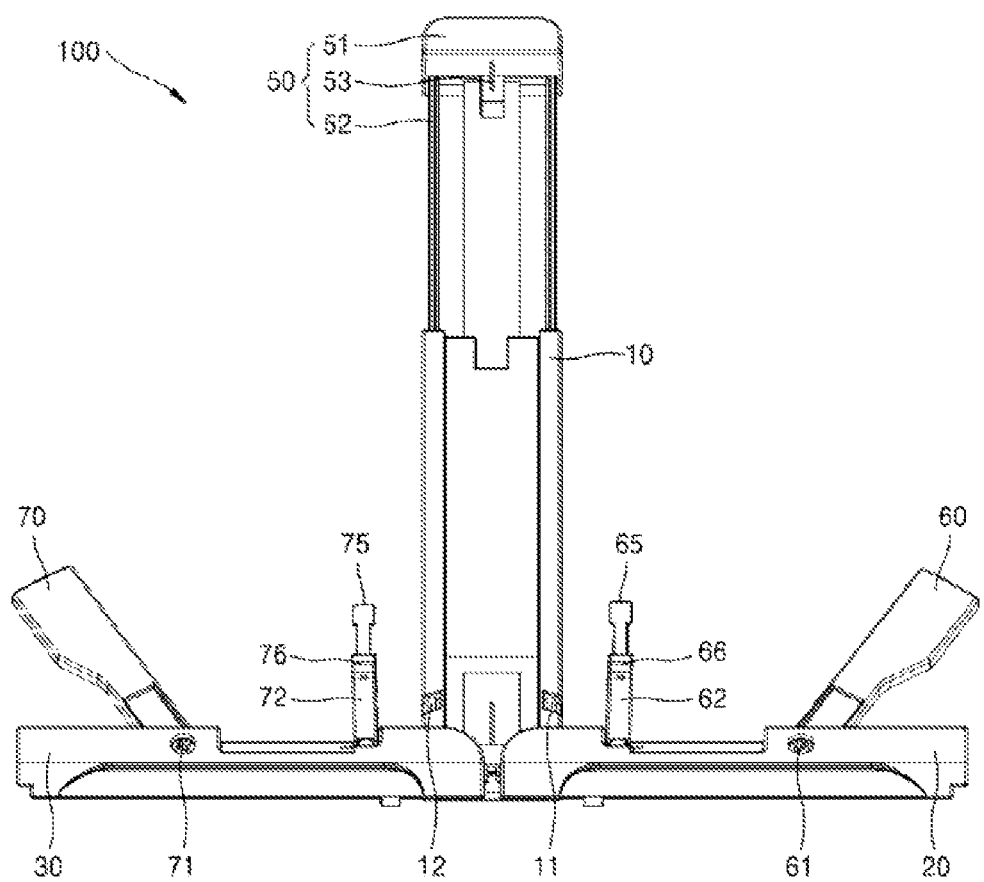
FIG. 2 is a front view illustrating the multi-holder for learning in FIG. 1.
Figure 3:
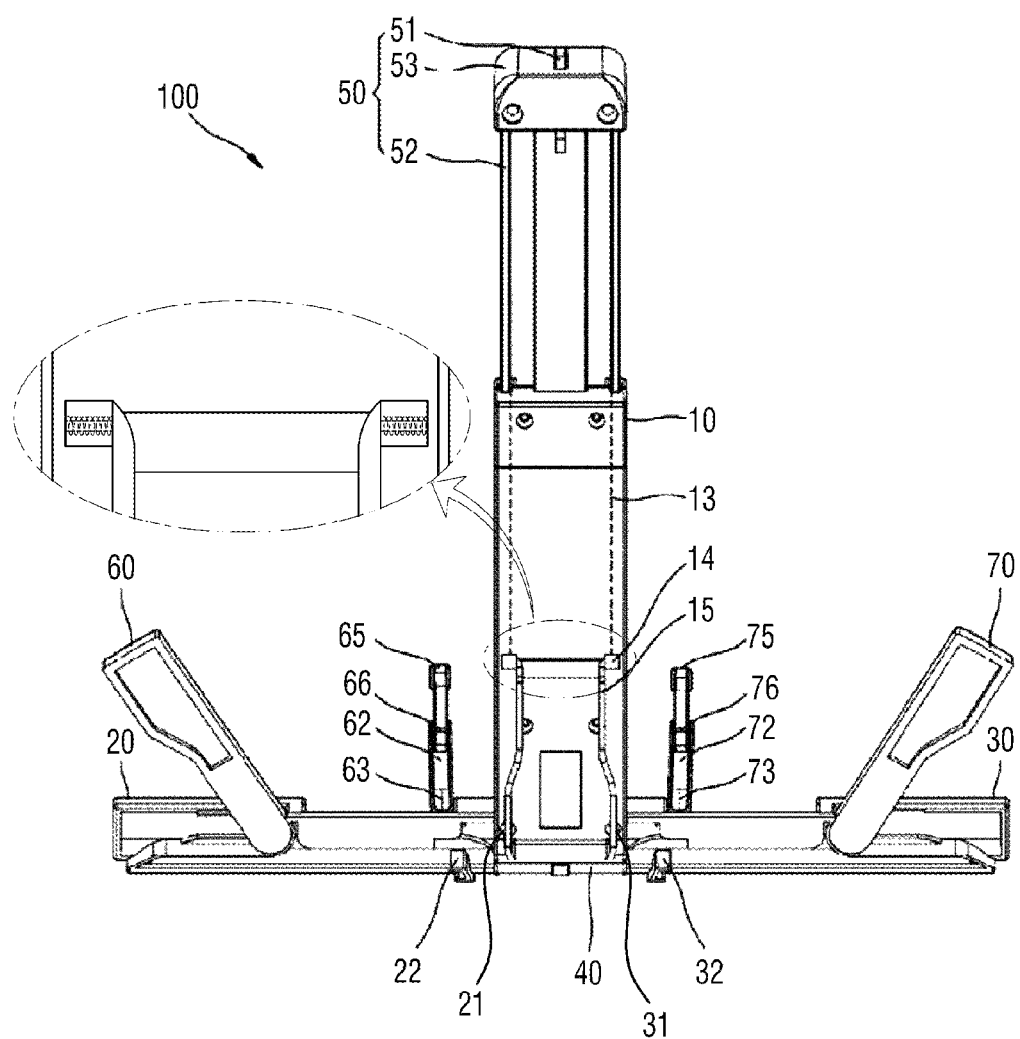
FIG. 3 is a rear view illustrating the multi-holder for learning in FIG. 1.
Figure 4:
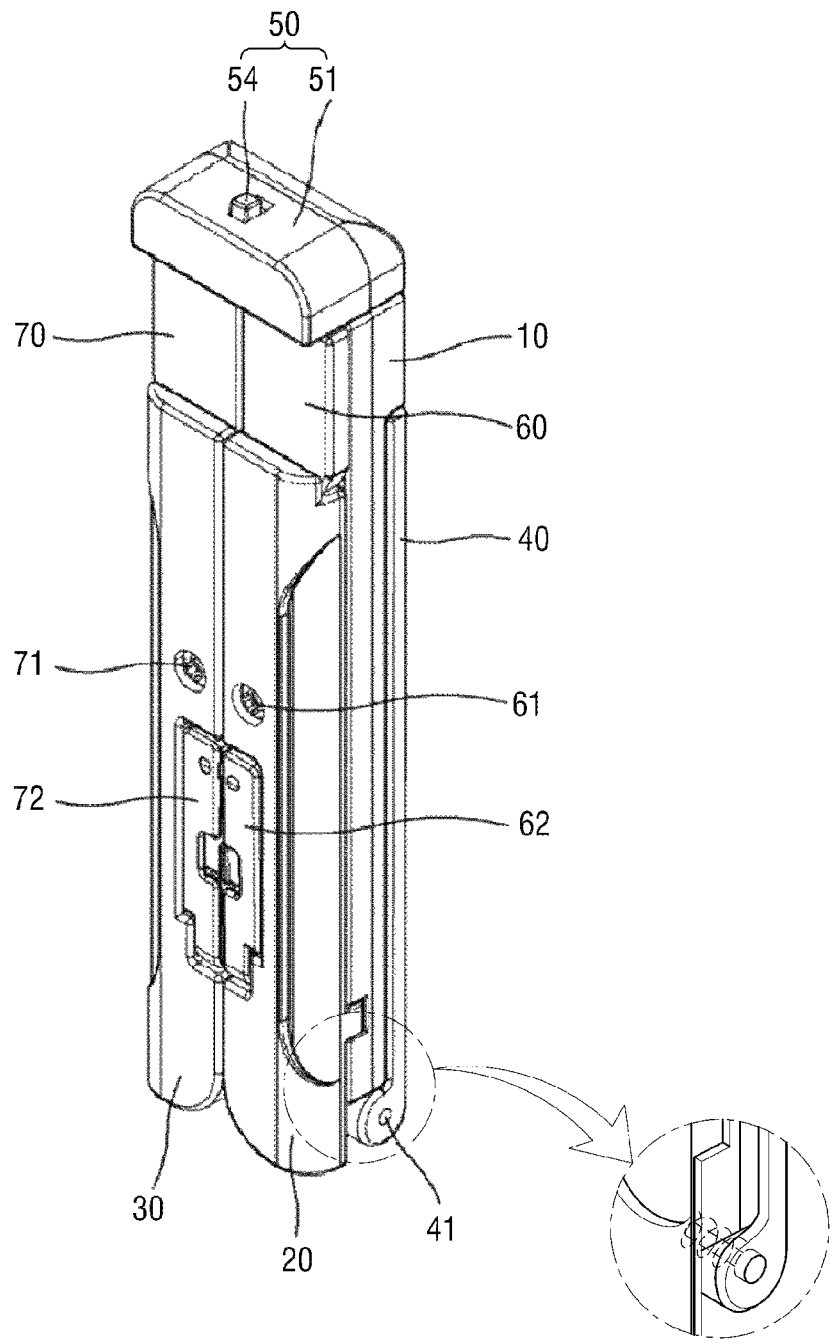
FIG. 4 is a right side view illustrating the multi-holder for learning in FIG. 1.

FIG. 1 is a perspective view illustrating a multi-holder 100 for learning according to one embodiment of the present invention, and FIGS. 2 to 4 are a front view, a rear view, and a right side view illustrating the multi-holder 100 for learning in FIG. 1.

As shown in FIGS. 1 to 4, the multi-holder 100 for learning may largely include a body 10, the first device for folding a support unit 20, the second device for folding a support unit 30, a folding floor plate device 40 and a fixing device 50.

As shown in FIGS. 1 to 4, the body 10 may include a rail 13 formed to allow the fixing device 50 to slide, a first connector 11 connectable to the first device for folding a support unit 20 and formed on a part of a left side of the body 10, and a second connector 12 connected to the second device for folding a support unit 30 and formed on a part of a right side of the body 10. More specifically, for example, in the body 10, the fixing device 50 for stably fixing an upper part of a book B or smart pad S may be formed and installed according to a height of the book B or smart pad S, and the rail 13 may be formed in the body 10 so that the fixing device 50 is connected to a lifting bar 52, which will be described below, and the lifting bar 52 may move upward and downward.

As shown in FIGS. 1 to 4, the first device for folding a support unit 20 may be hinge-coupled to one side of a lower part of the body 10 to be rotatable around a hinge shaft 21, may be folded in a longitudinal direction of the body 10 or rotated and unfolded in a direction toward one side of the book B or the smart pad S, and may include a first coupler 22 formed to be engaged with the first connector 11. More specifically, for example, the first device for folding a support unit 20 is linked with the body 10 and the hinge shaft 21, may be unfolded due to a weight of the first device for folding a support unit 20, may be unfolded because a first holding device 62 and second holding device 72, which will be described below, push each other, and may be assembled in a direction toward the body 10 when assembled. In addition, the hinge shaft 21 may include a spring coupled thereto to have a rotational force, and may have an elastic restoring force which unfolds the first device for folding a support unit 20 from the body 10.

Further, as shown in FIGS. 1 to 4, a support part may include a first support part 60 hinge-coupled to a hinge shaft 61 with a spring to be rotatable around the hinge shaft 61, and may be folded in a longitudinal direction of the first device for folding a support unit 20 or rotated and unfolded in an upward direction to support a rear part of the one side of the book B or smart pad S. Here, the first support part 60 may be rotated and unfolded in an upward direction by the spring when the first device for folding a support unit 20 is unfolded from the body 10. More specifically, for example, the first support part 60 is linked with the body 10 and the hinge shaft 61, and the hinge shaft 61 includes a spring coupled thereto to have a rotational force such that the first support part 60 may have an elastic restoring force to be unfolded from the first device for folding a support unit 20.

In addition, as shown in FIGS. 1 to 4, a holding device may include the first holding device 62. Here, the first holding device 62 may be hinge-coupled to a hinge shaft 63 with a spring to be rotatable around the hinge shaft 63, and may be folded in the longitudinal direction of the first device for folding a support unit 20 or rotated and unfolded in a forward direction to support a lower part of the one side of the book B or smart pad S. Here, the first holding device 62 receives an elastic restoring force to be folded by the spring of the first device for folding a support unit 20, and thus, may bind and hold the one side of the book B or smart pad S due to the elastic force acting in a direction toward the first device for folding a support unit 20. More specifically, for example, the first holding device 62 is linked with the first device for folding a support unit 20, and the hinge shaft 63 includes a spring coupled thereto to have the rotational force such that the first holding device 62 may have the elastic restoring force to be folded toward the first device for folding a support unit 20, stably hold the one side of the book B or smart pad S, and hold a page of the book B to prevent the page from being turned.

In addition, as shown in FIGS. 1 to 4, a press pin may include a first press pin 65 formed to be perpendicular to a longitudinal direction of the first holding device 62 and hinge-coupled to a hinge shaft 66 with a spring to be rotatable around the hinge shaft 66, and may be folded into the first holding device 62 or rotated and unfolded in the upward direction.

In addition, as shown in FIGS. 1 to 4, a groove portion may include a first groove portion 64 formed at a center of the first holding device 62 such that the press pin 65 may be easily removed. More specifically, for example, the first groove portion 64 is formed at the center of the first holding device 62 such that a user may easily lift the press pin 65 up, and the book B or smart pad S may be held on the first groove portion 64 and fixed without sliding. Further, the first groove portion 64 may support the lower part of the one side of the book B or smart pad S to prevent the book B or smart pad S from sliding.

In addition, as shown in FIGS. 1 to 4, the second device for folding a support unit 30 may be hinge-coupled to the other side of the lower part of the body 10 to be rotatable around a hinge shaft 31 formed to be parallel with the hinge shaft 21, may be folded in the longitudinal direction of the body 10 or rotated and unfolded in a direction toward the other side the book B or smart pad S, and may include a second coupler 32 formed to be engaged with the second connector 12. More specifically, for example, the second device for folding a support unit 30 is linked with the body 10 and the hinge shaft 31 to be unfolded due to the weight of the first device for folding a support unit 20, may be unfolded because the first holding device 62 and the second holding device 72, which will be described below, push each other, and may be assembled in the direction toward the body 10 when assembled. In addition, the hinge shaft 31 may include a spring coupled thereto to have a rotational force, and may have an elastic restoring force which unfolds the second device for folding a support unit 30 from the body 10.

In addition, as shown in FIGS. 1 to 4, the support part may include a second support part 70 hinge-coupled to a hinge shaft 71 with a spring to be rotatable around the hinge shaft 71, and may be folded in a longitudinal direction of the second device for folding a support unit 30 or rotated and unfolded in the upward direction to support a rear part of the other side of the book B or smart pad S. Here, the second support part 70 may be rotated and unfolded in the upward direction by the spring when the second device for folding a support unit 30 is unfolded from the body 10. More specifically, for example, the second support part 70 is linked with the body 10 and the hinge shaft 71, and the hinge shaft 71 includes a spring coupled thereto to have a rotational force such that the second support part 70 may have an elastic restoring force to be unfolded from the second device for folding a support unit 30. In addition, the first device for folding a support unit 20 and the second device for folding a support unit 30 may support both the sides of the book B or smart pad S by being unfolded to correspond to each other when unfolded to be used by the user, and may be folded in a direction toward the body 10, and, in this case, the first support part 60 and the second support part 70 face each other and may be assembled in directions toward the body 10.

In addition, as shown in FIGS. 1 to 4, the holding device 72 may include the second holding device 72. Here, the holding device 72 may include the second holding device 72 which may be hinge-coupled to a hinge shaft 73 with a spring to be rotatable around the hinge shaft 73, and may be folded in the longitudinal direction of the second device for folding a support unit 30 or rotated and unfolded in the forward direction to support a lower part of the other side of the book B or smart pad S. Here, the second holding device 72 receives an elastic restoring force to be folded by the spring of the second device for folding a support unit 30, and thus, may bind and hold the other side of the book B or smart pad S due to an elastic force acting in a direction toward the second device for folding a support unit 30. More specifically, for example, the second holding device 72 is linked with the second device for folding a support unit 30, and the hinge shaft 73 includes a spring coupled thereto to have the rotational force such that the second holding device 72 may have an elastic restoring force to be folded toward the second device for folding a support unit 30, stably hold the one side of the book B or smart pad S, and hold the page of the book B to prevent the page from being turned.

In addition, as shown in FIGS. 1 to 4, the press pin may include a second press pin 75 formed to be perpendicular to a longitudinal direction of the second holding device 72 and hinge-coupled to a hinge shaft 76 with a spring to be rotatable around the hinge shaft 76, and may be folded into the second holding device 72 or rotated and unfolded in the upward direction.

In addition, as shown in FIGS. 1 to 4, the groove portion may include a second groove portion 74 formed at a center of the second holding device 72 such that the second press pin 75 may be easily removed. More specifically, for example, the second groove portion 74 is formed at the center of the second holding device 72 such that the user may easily lift the press pin 75 up, and the book B or smart pad S may be held on the second groove portion 74 and fixed without sliding. Further, the second groove portion 74 may support the lower part of the other side of the book B or smart pad S to prevent the book B or smart pad S from sliding.

In addition, as shown in FIGS. 1 to 4, the folding floor plate device 40 may be formed to be rotatable around a hinge shaft 41 at a lower end portion of the body 10, and may be folded in the longitudinal direction of the body 10 or unfolded in a rearward direction to erect and support the body 10. For example, the folding floor plate device 40 may be rotated around the hinge shaft 41 at the lower end portion of the body 10 configured to support the book B or smart pad S to be unfolded therefrom, moreover, the folding floor plate device 40 may have an elastic restoring force to be unfolded from the body 10 due to the hinge shaft 41, which includes a spring coupled thereto to have a rotational force, at the lower end portion of the body 10, and may be unfolded by the fixing device 50. Accordingly, the unfolded folding floor plate device 40 may more stably support the body 10 configured to support the book B or smart pad S.

In addition, an angle adjusting device 15 formed to be rotatable around a hinge shaft 14 and folded in the longitudinal direction of the body 10 or rotated and unfolded in the rearward direction, and thus to be capable of adjusting an angle of the body 10, may further be included. For example, the angle adjusting device 15 may be formed behind the body 10 and linked with the hinge shaft 14 to be rotatable around the hinge shaft 14. Accordingly, the angle adjusting device 15 may be rotated such that an angle of the book B or smart pad S may be adjusted according to the body and a tendency of the user, and thus the user may easily use the multi-holder 100 for learning.

In addition, the angle adjusting device 15 may include an angle adjusting device fixing unit 42 formed with a plurality of steps on the folding floor plate device 40 to be fixed and not pushed. For example, the folding floor plate device 40 may include the angle adjusting device fixing unit 42 in a lower part thereof so as not to be reassembled by a weight of the book B or smart pad S after being unfolded from the body 10. Here, the angle adjusting device fixing unit 42 in the lower part of the folding floor plate device 40 may include a plurality of angle adjusting device fixing units 42A, 42B, and 42C. Since each of the angle adjusting device fixing units 42A, 42B, and 42C is formed at an arbitrary interval to form the angle adjusting device 15 of the body 10 and adjust the angle of the book B or smart pad S, convenience for the user can be improved.

In addition, as shown in FIGS. 1 to 4, the fixing device 50 may be adjustable in height by being slid in the longitudinal direction of the body 10, and may be formed at an upper part of the body 10 to fix an upper part of the book B or smart pad S having different heights. More specifically, for example, the fixing device 50 may include a fixing head 51, the lifting bar 52, a fixing pin 53, and a switch 54.

For example, the fixing head 51 may be formed to fix the upper part of the book B or smart pad S, the lifting bar 52 may be formed to be linked with the first connector 11 and the second connector 12 and slide on the rail 13, and the fixing pin 53 may be formed in a pin shape on a lower part of the fixing head 51 to fix a center of the upper part of the book B. Here, the fixing pin 53 may be formed to protrude in the forward direction such that the book B may be conveniently fixed by being moved upward when the switch 54 located on an upper part of the fixing head 51 is pressed. In addition, a lower part fixing pin may also be formed on the lower part of the body 10 to fix a lower part of the book B in correspondence with the fixing pin 53. More specifically, for example, the first connector 11 of the body 10 may be connected to the first coupler 22 of the first device for folding a support unit 20, and the second connector 12 may be connected to the second coupler 32 of the second device for folding a support unit 30. In this case, a lower end portion of the lifting bar 52 linked with the first connector 11 and the second connector 12 may be hook-coupled to the coupler 22 when the fixing device 50 is located at a lower level, the first connector 11 and the second connector 12 of the body 10 are disconnected from the first coupler 22 of the first device for folding a support unit 20 and the second coupler 32 of the second device for folding a support unit 30 when the fixing device 50 is moved upward, and the first device for folding a support unit 20 and the second device for folding a support unit 30 may be unfolded toward one side and the other side of the multi-holder 100 for learning.

For example, a protrusion of the lower end portion of the lifting bar 52 linked with the first connector 11 and the second connector 12 may be engaged with and connected to the coupler 22 when the fixing device 50 is located at the lower level, and the fixing head 51 and the lifting bar 52 are moved upward by the rail 13 formed in the body 10 when the fixing device 50 is moved upward, and accordingly, the first coupler 22 of the first device for folding a support unit 20 and the second coupler 32 of the second device for folding a support unit 30 are disconnected from the first connector 11 and the second connector 12 of the body 10, and the first device for folding a support unit 20 and the second device for folding a support unit 30 may be unfolded toward the one side and the other side of the multi-holder 100 for learning by the springs included in the hinge shafts 21 and 31. Accordingly, the user does not need to perform various actions and may unfold the multi-holder 100 for learning by only moving the fixing head 51 upward.

Figure 5:
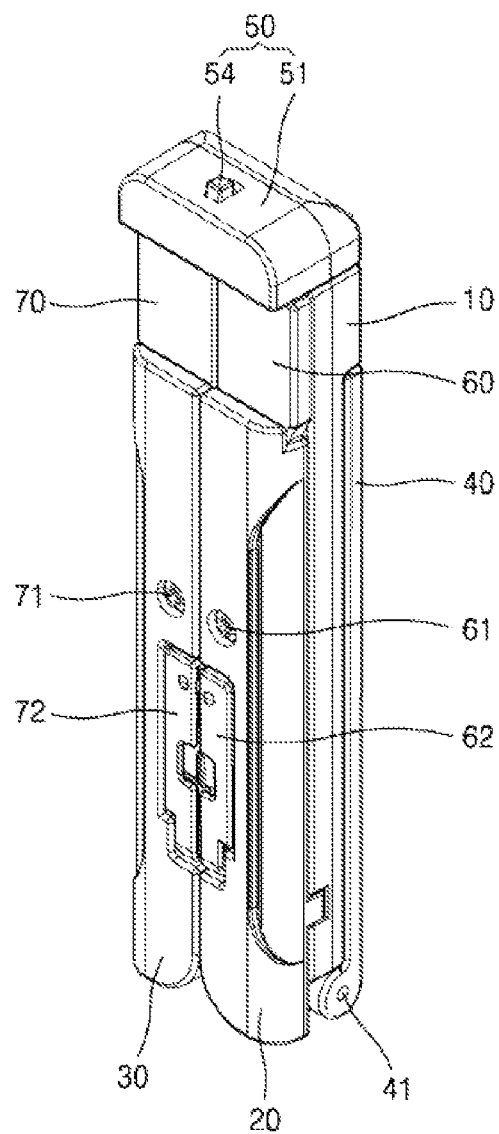
FIG. 5 is a perspective view illustrating an assembly in which the multi-holder for learning in FIG. 1 is assembled.

FIG. 5 is a perspective view illustrating an assembly in which the multi-holder 100 for learning in FIG. 1 is assembled.

As shown in FIG. 5, the first device for folding a support unit 20, the second device for folding a support unit 30, the folding floor plate device 40, and the fixing device 50 of the multi-holder 100 for learning are in a folded and assembled state, and thus, are formed to be portable and movable when not used by a user.

Figure 6:
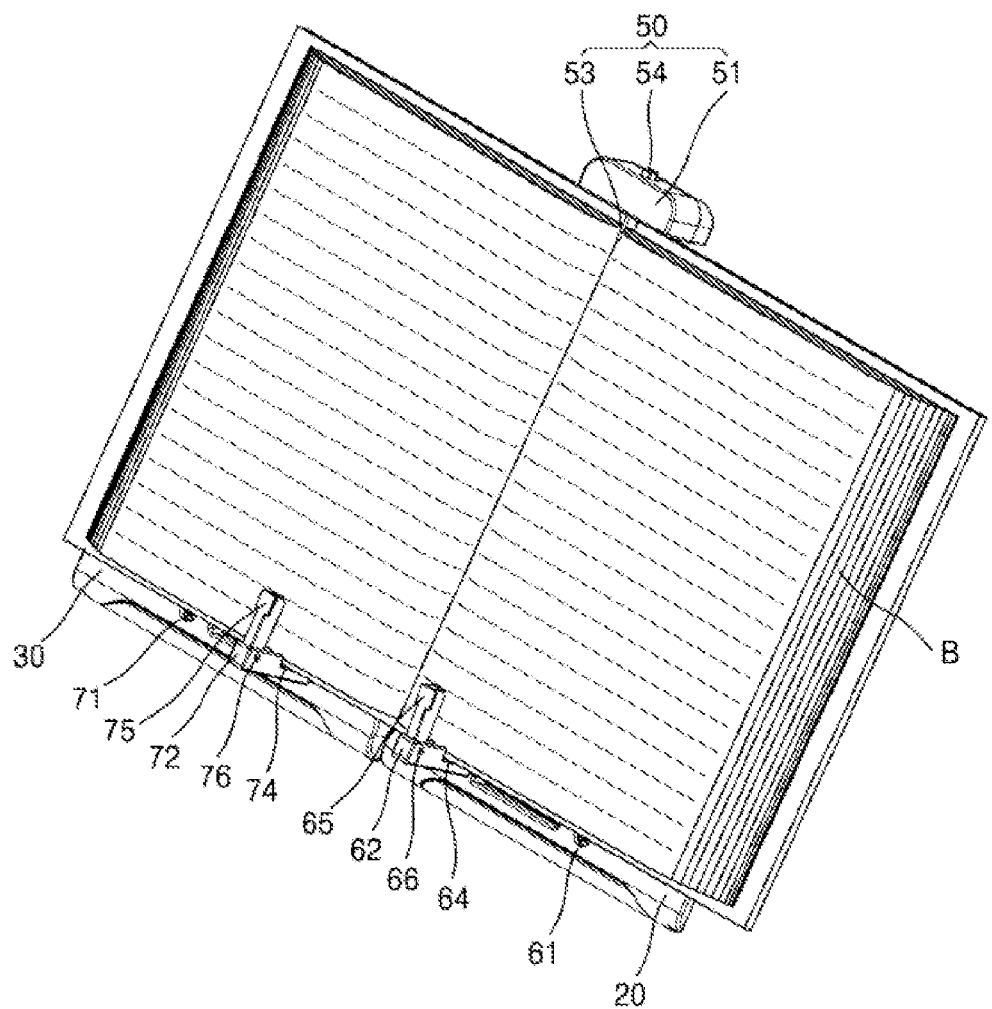
FIG. 6 is a perspective view illustrating the multi-holder for learning in FIG. 1 holding a book.
Figure 7:
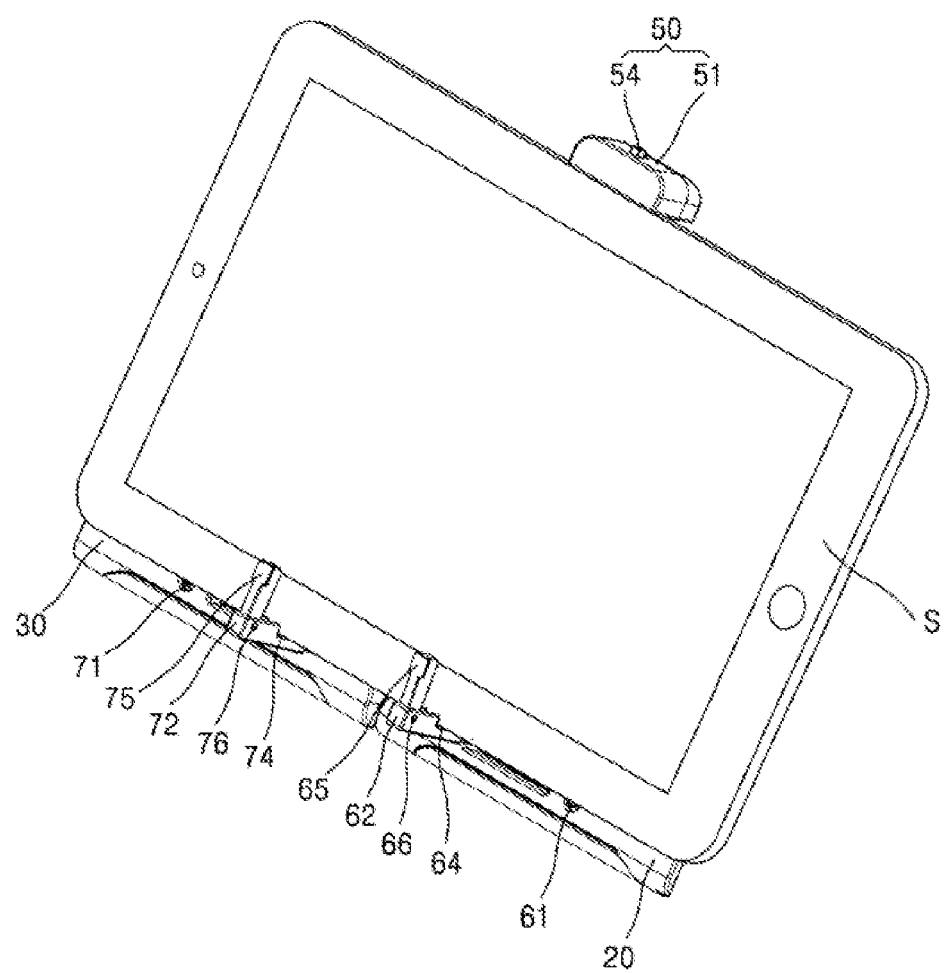
FIG. 7 is a perspective view illustrating the multi-holder for learning in FIG. 1 holding a smart pad.

FIGS. 6 and 7 are perspective views illustrating the multi-holder 100 for learning in FIG. 1 which holds the book B or smart pad S.

As shown in FIGS. 6 and 7, the multi-holder 100 for learning may hold the book B or smart pad S and may be adjustable to be easily used by a user when holding the book B or smart pad S, but the multi-holder 100 for learning is not limited to using the book B or smart pad S.

Although the present invention has been described with reference to the embodiment shown in the drawings, the embodiment is only exemplary, and those skilled in the art should understand that various modifications and other equivalent embodiments of the present invention are possible. Accordingly, the technical scope of the present invention should be determined by the technical spirit of the scope of the appended claims.

INDUSTRIAL APPLICABILITY

As described above, according to the embodiments of the present invention, since a press pin formed on a device for folding a support unit is installed on a holding device, pages of a book held on a holder can be supported by the press pin, and thus the book can be conveniently read because the pages of the book are prevented from being turned. Further, since the press pin binds an end portion of an inclined book to prevent the book from being pushed toward the front of the holder, a state of the holder can be stably maintained. Since a groove portion is formed, the book or smart pad can be more stably seated on the holder. In addition, since all parts are hinged to be easily portable and capable of being conveniently stored and used and a device for folding a support unit and a support part are unfolded by sliding a fixing head, the multi-holder for learning can be easily used, and thus profit can be produced by selling the multi-holder for learning.

What is claimed is:

1. A multi-holder for learning, comprising:
   a body;
   the first device for folding a support unit hinge-coupled to one side of a lower part of the body to be rotatable around a hinge shaft, and folded in a longitudinal direction of the body or rotated and unfolded in a direction toward one side of a book or smart pad;
   the second device for folding a support unit hinge-coupled to other side of the lower part of the body to be rotatable around a hinge shaft formed to be parallel with the hinge shaft, and folded in the longitudinal direction of the body or rotated and unfolded in a direction toward other side of the book or smart pad;

a folding floor plate device formed to be rotatable around a hinge shaft at a lower end portion of the body, and folded in the longitudinal direction of the body or unfolded in a rearward direction to erect and support the body; and a fixing device configured to allow a height of the body to be adjustable by sliding in the longitudinal direction of the body and formed on the body to fix an upper part of the book or the smart pad having different heights, wherein the body includes, a rail formed to allow the fixing device to slide;

a first connector connected to the first device for folding a support unit and formed on a part of a left side of the body; and a second connector connected to the second device for folding a support unit and formed on a part of a right side of the body, wherein the fixing device includes, a fixing head formed to fix the upper part of the book or smart pad;

a lifting bar linked with the first connector and the second connector and configured to slide on the rail; and a fixing pin formed in a pin shape on a lower part the fixing head to fix a center of the upper part of the book, and a switch linked with the fixing pin to lift the fixing pin in an upward direction.

2. The multi-holder of the claim 1, wherein the first device for folding a support unit and the second device for folding a support unit include:

a support part hinge-coupled to a hinge shaft with a spring to support rear parts of one side and other side of the book or smart pad to be rotatable around the hinge shaft, and folded in a longitudinal direction of the first device for folding a support unit or rotated and unfolded in an upward direction;

a holding device hinge-coupled to a hinge shaft with a spring to support lower parts of the one side and the other side of the book or smart pad and to be rotatable around the hinge shaft, and folded in the longitudinal direction of the first device for folding a support unit or rotated and unfolded in a forward direction; and a coupler engaged with the first connector and the second connector.

3. The multi-holder of the claim 2, wherein the support part is rotated and unfolded by spring in the upward direction when the first device for folding a support unit and the second device for folding a support unit are unfolded from the body.

4. The multi-holder of the claim 2, wherein the holding device includes:

a press pin formed to be perpendicular to a longitudinal direction of the holding device and hinge-coupled to a hinge shaft with a spring to be rotatable around the hinge shaft, and folded into the holding device or rotated and unfolded in the upward direction; and a groove portion formed at a center of the holding device such that the press pin is easily removed.

5. The multi-holder of the claim 2, wherein the holding device receives an elastic restoring force to be folded by the springs of the first device for folding a support unit and the second device for folding a support unit to bind and hold one side of the book or smart pad due to elastic forces acting in directions toward the first device for folding a support unit and the second device for folding a support unit.

6. The multi-holder of the claim 1, wherein:

a lower end portion of the lifting bar linked with the first connector and the second connector is hook-coupled to the coupler when the fixing device is located at a lower location; and when the fixing device is moved in the upward direction, the first connector and the second connector are disconnected from the coupler so that the first device for folding a support unit and the second device for folding a support unit are unfolded toward both sides of the multi-holder.

* * * * *